United States Patent [19]

Wilkins

[11] Patent Number: 4,927,200
[45] Date of Patent: May 22, 1990

[54] STORAGE CONTAINER AND FASTENER ASSEMBLY FOR CARS

[76] Inventor: John D. Wilkins, 75 Kenley Road, Kingston upon Thames, England, KT1 3RR

[21] Appl. No.: 305,726
[22] PCT Filed: Jul. 30, 1987
[86] PCT No.: PCT/GB87/00543
§ 371 Date: Jan. 30, 1989
§ 102(e) Date: Jan. 30, 1989
[87] PCT Pub. No.: WO88/00895
PCT Pub. Date: Feb. 11, 1988
[51] Int. Cl.⁵ .............................. B60R 7/04
[52] U.S. Cl. ................. 296/37.8; 296/37.15; 224/271; 297/188
[58] Field of Search ............ 296/37.80, 37.15; 224/42.42, 271; 297/188

[56] References Cited
U.S. PATENT DOCUMENTS

| | | | |
|---|---|---|---|
| 3,014,759 | 12/1961 | Bing | 296/37.15 |
| 3,120,404 | 2/1964 | Bramming | 297/188 |
| 3,526,314 | 9/1970 | Trammell, Jr. | 224/275 |
| 3,598,232 | 8/1971 | Trammell, Jr. | 224/275 |
| 3,913,810 | 10/1975 | Shaw | 224/275 |
| 4,180,299 | 12/1979 | Tolerson | 312/242 |

FOREIGN PATENT DOCUMENTS 2851572 6/1980 Fed. Rep. of Germany .
2915333 10/1980 Fed. Rep. of Germany .
8609769 9/1986 Fed. Rep. of Germany .

Primary Examiner—Robert R. Song
Attorney, Agent, or Firm—Thomas J. Dodd

[57] ABSTRACT

A storage container with a fastener assembly for detachably fixing the container to a vehicle seat. The fastener assembly is integral with, or is attachable to—by means—a frame member of the seat. The container has a back plate which, in use, lies adjacent to the front of the seat, with the container resting on the car floor. The fastener assembly includes spring biased clips which are engageable within wedge shaped grooves formed in the back plate of the container, whereby the container is detachably held in position against the front of the seat on the car floor.

14 Claims, 4 Drawing Sheets

STORAGE CONTAINER AND FASTENER ASSEMBLY FOR CARS

This invention relates to a storage container and fastener assembly for car interiors.

Car interiors are normally provided with such means of storage as lidded glove lockers in the fascia panel, parcel shelves below the fascia panel, and trays or pockets in doors. Horizontal recessed areas may also be incorporated in the top of the fascia panel, or as part of the transmission tunnel cover.

Nevertheless, these means frequently provide inadequate storage for all the items which the occupants wish to carry inside the car. Other receptacles, such as small cases, shopping bags and handbags, may therefore be used as well, but these are generally of inconvenient shape, often obstruct the occupants' normal posture, and may cause discomfort. Furthermore, they are not secured to the car, and thus are prone to movement as the car corners, accelerates and brakes. Such movement may interfere with the driver's proper control of the car.

The present invention provides a storage container and a fastener assembly for detachably fixing the container to a vehicle seat, the fastener assembly being attachable to, or integral with, the vehicle seat, the container having a first wall adapted to engage with the floor of the vehicle in front of said seat, and the container having a second wall adapted to lie adjacent to the front of said seat, wherein the fastener assembly is provided with a pair of spring-biassed clips engageable with grooves in the side walls of the container for detachably holding the container.

Such a specially-shaped container rests on the floor of the car, against the front edge of the seat and below the occupant's legs. The container is releasably secured to the seat by the fastener assembly, which may be incorporated into the seat structure or be fixed to an existing seat. The fastener assembly secures the container firmly, yet allows its quick removal both for access to the seat adjustment mechanism, and to allow the container to be used outside the car as a piece of luggage.

In a preferred embodiment, the clips are mounted at opposite ends of a transverse bar which can be fixed to the frame of said seat, the transverse bar extending at least as far as the side walls of the container. Preferably, each of the clips is pivotally mounted in a respective housing, and each clip is engageable with a respective wedge-shaped groove formed in the associated side wall of the container adjacent to the rear wall. Advantageously, the wedge-shaped grooves are vertical grooves. This permits the clips to engage with the grooves over a wide range of height positions. Conveniently, the clips and their housings are positioned at the opposite ends of the bar.

The container may be made of a rigid material, such as ABS or polypropylene. In this case, the container is formed with a top opening which is closable by means of a lid, the lid being slidably mounted on the container for movement to and fro across the top opening.

Alternatively, the second wall of the container is a rigid back plate or frame which supports a flexible bag-like member. In this case, the flexible bag-like member may be provided with a zipped-in flap.

Preferably, the bar can be fixed to the seat frame by means of brackets, formed metal strips, nuts and bolts. The container may be provided with a carrying handle.

Specific embodiments of the invention will now be described, by way of example, with reference to the accompanying drawings, in which.

Figure 1:
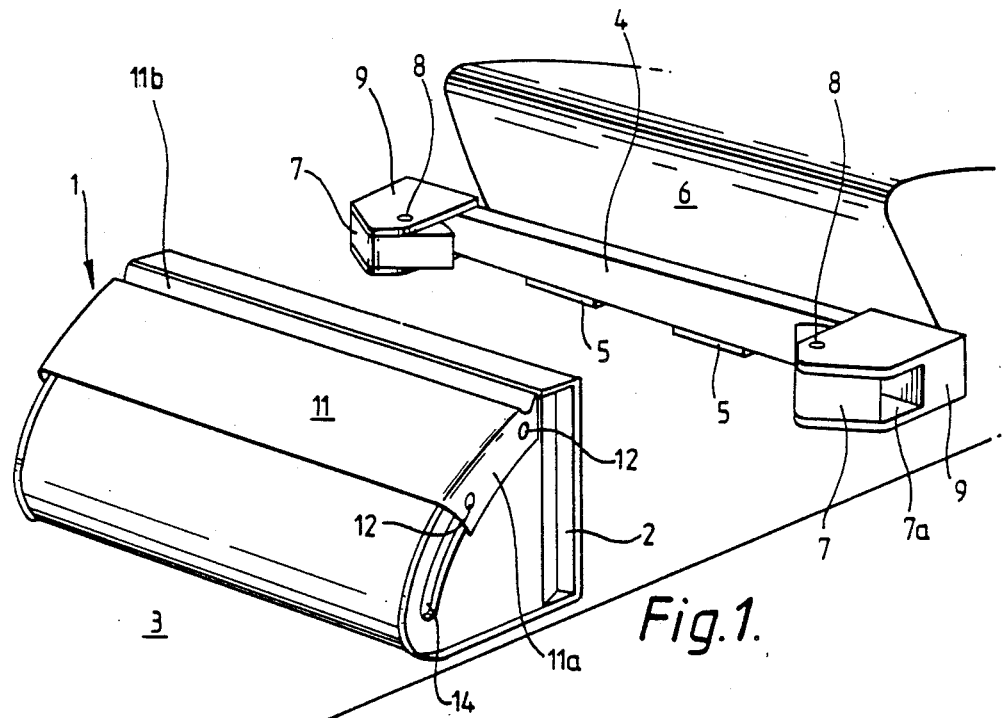
FIG. 1 is a perspective view of a first form of container and a seat attachment assembly, the container being shown with its lid in the closed position.
Figures 2, 3:
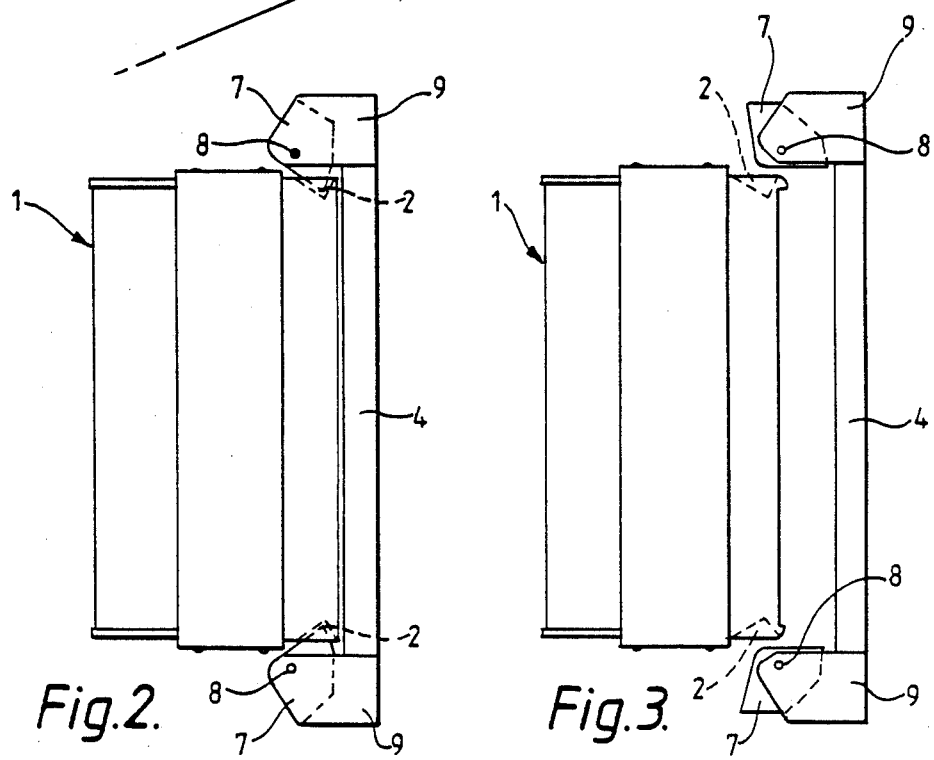
FIG. 2 is a plan view of the container of FIG. 1 secured in position.
FIG. 3 is a plan view of the container of FIG. 1 after release.
Figure 4:
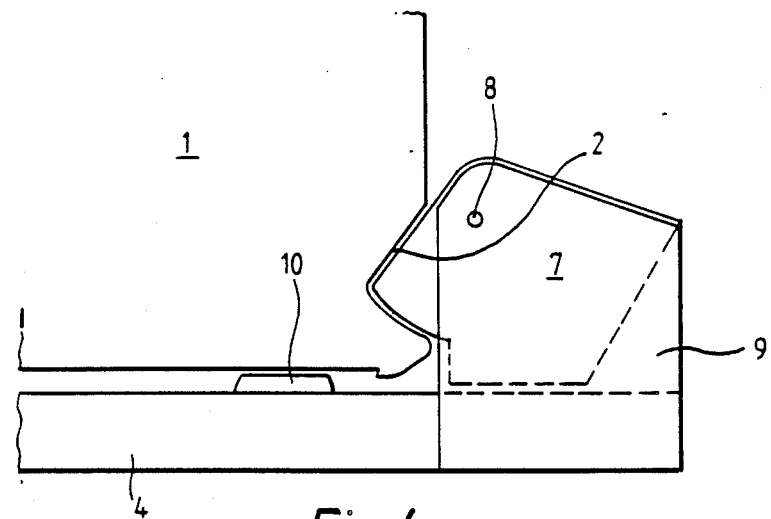
FIG. 4 is an enlarged view of a fastening clip forming part of the attachment assembly of FIG. 1.

Referring to the drawings, FIG. 1 shows a container 1 incorporating vertical wedge-shaped grooves 2 in each side face, the container resting on the floor 3 of a car. A horizontal bar 4, of rectangular cross-section, is fitted by brackets 5 to a car seat 6. Fastening clips 7 are provided at each end of the bar 4, the fastening clips being pivotally mounted about respective pivot pins 8 within respective housings 9 provided at the ends of the bar 4. The clips 7 are biassed inwardly towards the container 1 by springs (not shown) so that they normally protrude beyond their housings 9 (as shown in FIGS. 2 and 4). In order to cushion the container 1 against the bar 4, the bar is provided with buffers 10 made of spongy rubber (see FIG. 4). In use, the container 1 is pushed backwards towards the seat 6. As the container 1 approaches the seat 6, its side faces contact the portions of the clips 7 protruding from the housings 9, thereby forcing the clips outwards against the spring force. Further backwards movement of the container 1 aligns the wedge-shaped grooves 2 with the clips 7, which are then forced inwardly by their springs and into the grooves, thereby retaining the container 1 firmly against the bar 4, as shown in FIGS. 2 and 4.

The container 1 can be removed from the seat 6 by forcing the clips 7 outwardly away from the container to disengage them from the grooves 2, and by then pulling the container forward and clear of the clips, as shown in FIG. 3. In order to force the clips 7 outwards, the user needs only to push a finger into each of the recesses 7a (one of which is shown in FIG. 1) formed between the housings 9 and the clips.

Other known means of releasable attachment may be used such as toggle clamps, with the releasable section mounted either on the bar or on the container. An advantage of the particular arrangement described is that the clips 7 can engage and retain the container 1 over a wide range of heights along the grooves 2, thereby allowing for variations in the height of the seat 6 and the bar 4 above the car floor 3.

Figure 5:
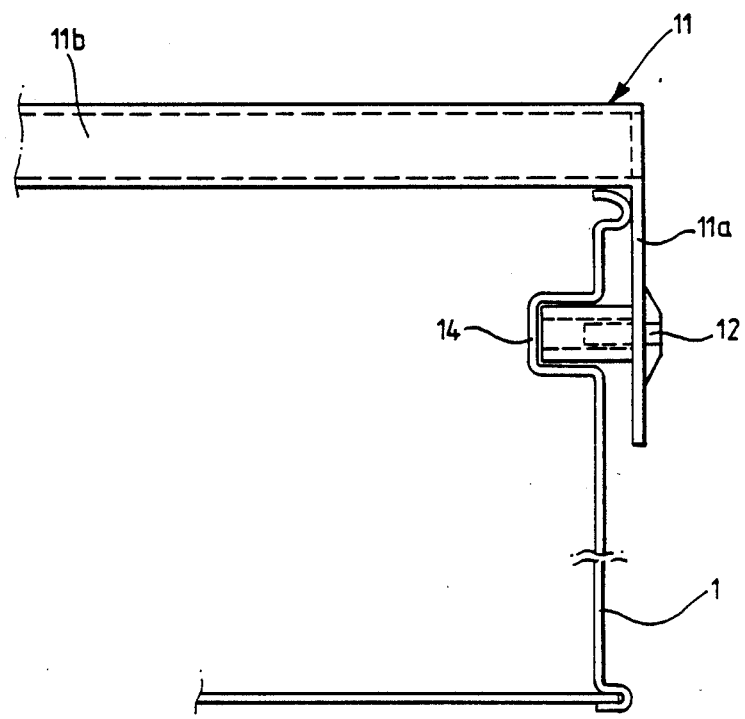
FIG. 5 is a schematic, partial cross-section of the container of FIG. 1 showing how its lid is connected.
Figure 7:
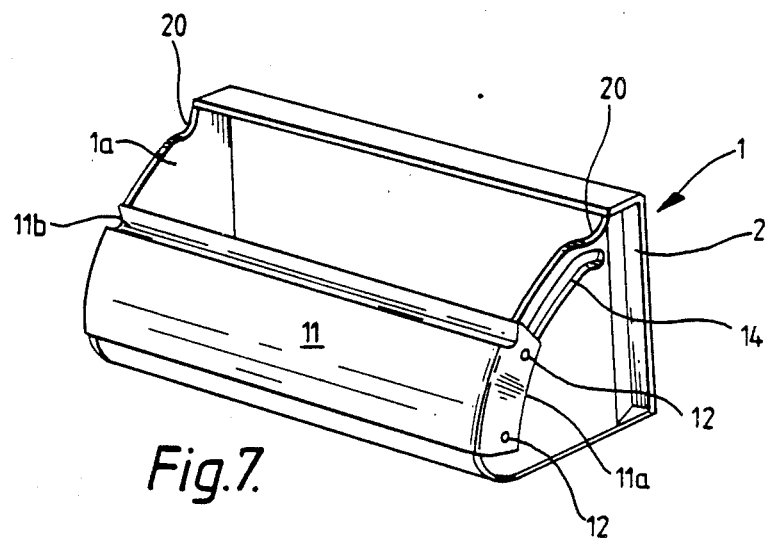
FIG. 7 is a perspective view of the first form of container, with its lid in the open position.

As shown in FIG. 1, the container 1 is provided with a lid 11 which is slidable to and fro over a top opening 1a (see FIG. 7). The lid 11 carries a pair of drive rivets 12 on each of its side walls 11a. The rivets 12 support nylon bushes 13 which slidably fit within channels 14 formed in the side faces of the container 1 (see FIG. 5). The lid 11 is formed with a finger groove 11b, by means of which the lid can be slid to and fro over the opening 1a.

As a protection against theft, the clips 7 may be lockable in the engaged position to secure the container and attachment assembly together and prevent removal. Alternatively, other locks may be provided.

Figure 6:
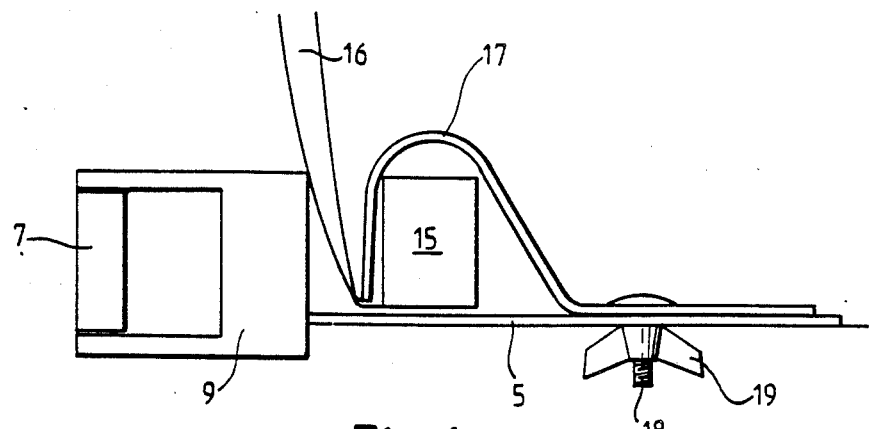
FIG. 6 shows means for fixing the attachment assembly of FIG. 1 to a vehicle seat.

The attachment assembly is fixed permanently to the car seat 6 by means such as that illustrated in FIG. 6. As is normal, the seat 6 has a metal bar or pressing 15 running across its lower front edge, seat upholstery material 16 being fastened to the bar 15. The brackets 5 extend rearwardly of the bar 4, and are punched with holes at intervals. A respective formed metal strip 17 is fixed to each bracket 5 by respective bolts 18 and wing nuts 19, the bolts passing through aligned holes in the brackets 5 and the strips 17. The brackets 5 are provided with a series of spaced holes so that the strips 17 can be fixed to the brackets to suit the particular seat configuration. The curved end portions of the strips 17 pass over the seat bar 15, so that tightening the nuts 19 secures the assembly to the seat 6.

Alternatively, if the car seat has a solid, shaped underside, the brackets 5 can be fixed to the seat by expanding bolts or rivets through holes drilled in the seat underside.

The exact positioning of the bar assembly 4, 5 and 7, both vertically and horizontally, is chosen so as to avoid (or at least minimise) interference with seat adjustment mechanisms, which usually consist of bars or levers projecting from the underneath or side of the seat. Various shapes and positions of the brackets 5 and the strips 17 other than those shown may be used to assist this.

As an alternative to forming part of a separate attachment assembly, the clips 7 (or other suitable fastenings) may be built directly into the seat structure.

The container 1 may have any desired cross-section, including that of a quadrant, a modified triangle or a polygon, which enables it to fit conveniently into the space between the car floor 3, the front of the seat 6 and the occupant's legs. Its lid 11 can be opened and closed in such a way that it does not interfere significantly with the occupant's leg position The particular form of container 1 shown in FIG. 1 is typically constructed of a rigid plastics material such as ABS or polypropylene.

The lid 11 may be conveniently retained in the closed position by providing a rounded section (not shown) on the underside of the lid which, as the lid is pulled upwards, progressively presses against specially-shaped top edges of the side faces of the container 1 until it springs or drops downwards into grooves 20 formed in the side faces adjacent to the top edge of the opening 1a (see FIG. 7). Alternatively, other closures such as magnetic or spring catches may be used.

Figure 8:
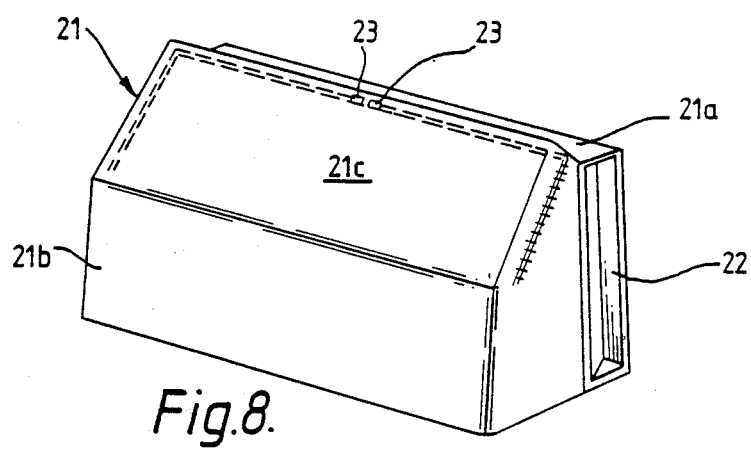
FIG. 8 is a perspective view of a second form of container in the closed position.
Figure 9:
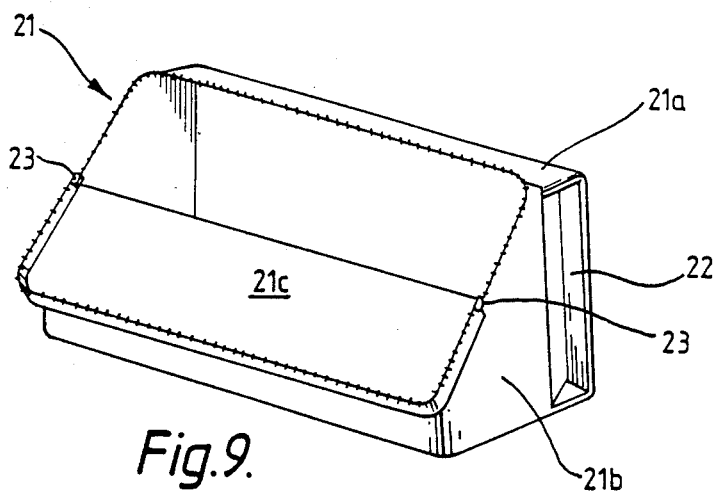
FIG. 9 is a perspective view of the second form of container in the open position.

FIGS. 8 and 9 show a second form of container 21, which has a rigid back plate or frame 21a carrying the wedge-shaped grooves 22. The back plate or frame 21a supports a bag 21b made of soft and deformable material such as plastics-coated woven fabric. Access to the contents of this container 21 is provided by means of a flap 21c zipped on three sides by twin zips 23. One advantage of this form of flexible container 21, is that it can be squashed against the front edge of the seat when not in use.

Figure 10:
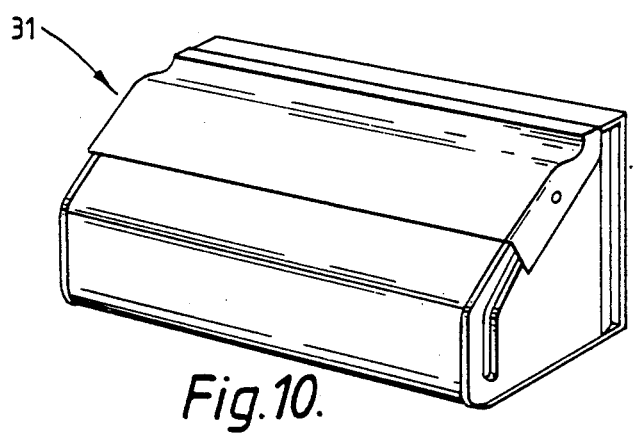
FIG. 10 is a perspective view of a third form of container with its lid closed.
Figure 11:
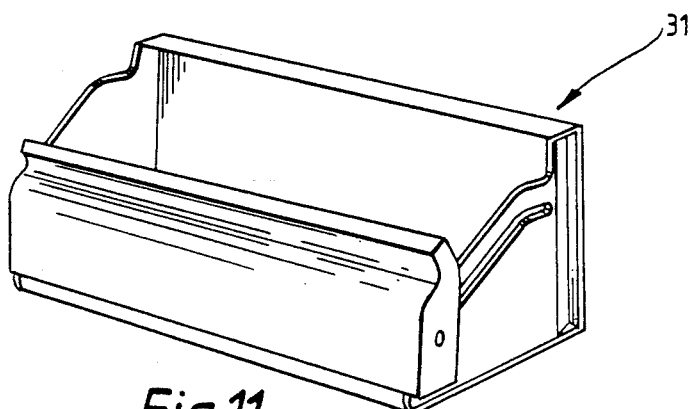
FIG. 11 is a perspective view of the third form of container with its lid open.

FIGS. 10 and 11 show a modified form of rigid container 31. This container 31 is generally polygonal in shape. Otherwise, it is similar to the container 1.

Any of the containers described above may be fitted with a carrying handle, straps and locks as with conventional luggage.

Whilst the containers of the invention are most generally useful in relation to the front seats of cars, they may also be fitted to rear car seats or other vehicle seats whenever the seat, floor and occupant configuration permits this.

I claim:

1. A storage container and a fastener assembly for detachably fixing the container to a vehicle seat, the fastener assembly being attachable to, or integral with, the vehicle seat, the container having at least a base wall, a rear wall and a pair of side walls, the base wall being adapted to engage with the floor of the vehicle in front of said seat, and the rear wall being adapted to lie adjacent to the front of said seat, wherein the fastener assembly is provided with a pair of spring-biassed clips engageable with grooves in the side walls of the container for detachably holding the container.

2. An arrangement as claimed in claim 1, wherein the clips are mounted at opposite ends of a transverse bar which can be fixed to the frame of said seat, the transverse bar extending at least as far as the side walls of the container.

3. An arrangement as claimed in claim 1 or claim 2, wherein each of the clips is pivotally mounted in a respective housing, and each of the clips is engageable with a respective wedge-shaped groove formed in the associated side wall of the container adjacent to the rear wall.

4. An arrangement as claimed in claim 3, wherein the wedge-shaped grooves are vertical grooves.

5. An arrangement as claimed in claim 2, wherein the clips and their housings are positioned at the opposite ends of the bar.

6. An arrangement as claimed in claim 1, wherein the container is made of a rigid material.

7. An arrangement as claimed in claim 6, wherein said rigid material is ABS or polypropylene.

8. An arrangement as claimed in claim 6 or claim 7, wherein the container is formed with a top opening which is closable by means of a lid.

9. An arrangement as claimed in claim 8, wherein the lid is slidably mounted on the container for movement to and fro across the top opening.

10. An arrangement as claimed in claim 9, wherein the lid is slidably mounted on the container by means of bushes which run in channels formed in the side walls of the container.

11. An arrangement as claimed in claim 1, wherein the rear wall of the container is a rigid back plate or frame which supports a flexible bag-like member.

12. An arrangement as claimed in claim 11, wherein the flexible bag-like member is provided with a zipped-in flap.

13. An arrangement as claimed in claim 2, wherein the bar can be fixed to the seat frame by means of brackets, formed metal strips, nuts and bolts.

14. An arrangement as claimed in claim 1, wherein the container is provided with a carrying handle.

* * * * *